Nov. 5, 1963 L. P. FRIEDER ETAL 3,109,460
SPIRALLY WRAPPED HEAT RESISTANT HOSE
Filed Jan. 18, 1960
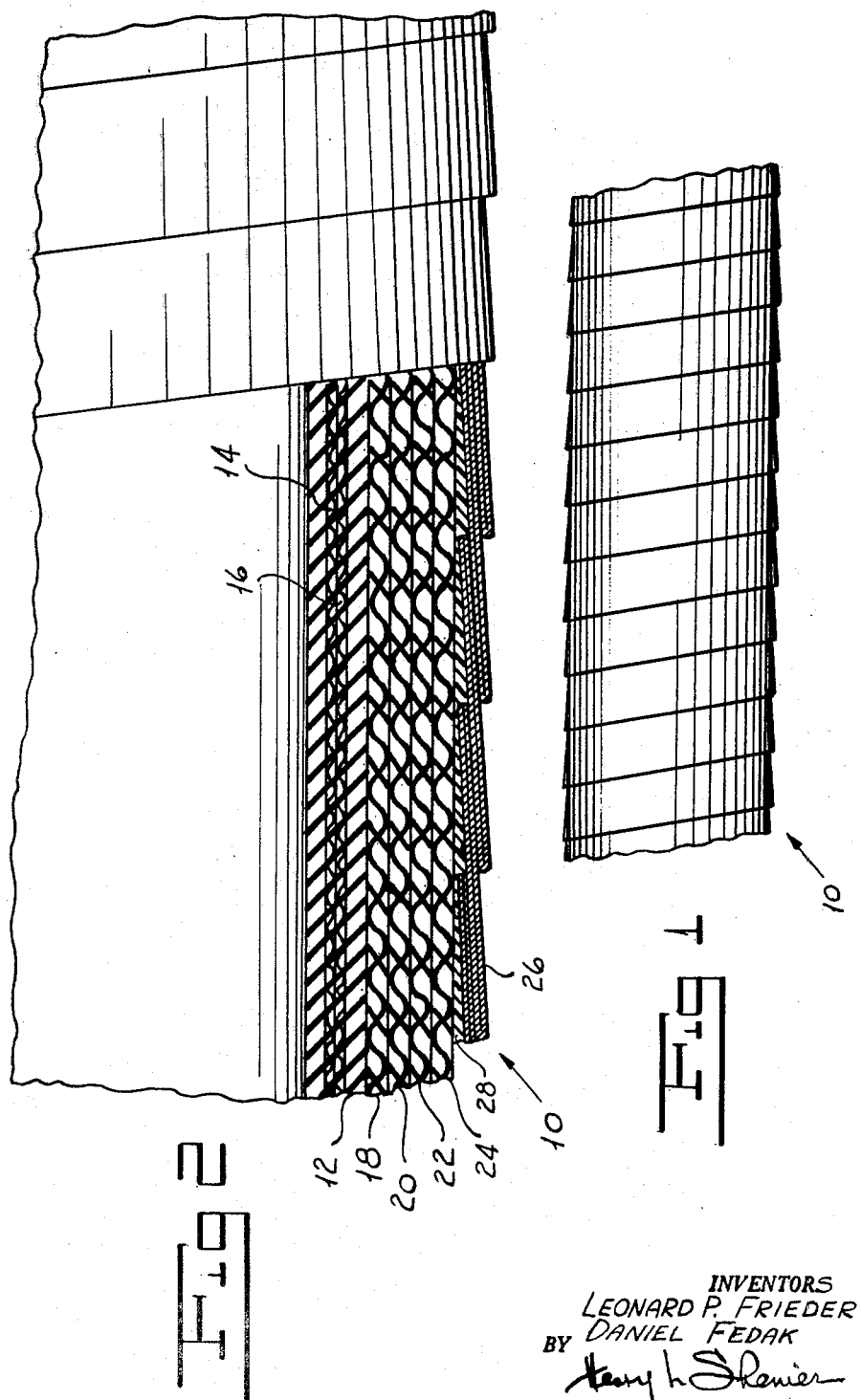
INVENTORS
LEONARD P. FRIEDER
BY DANIEL FEDAK
ATTORNEY

SPIRALLY WRAPPED HEAT RESISTANT HOSE

Leonard P. Frieder, Great Neck, N.Y., and Daniel Fedak, Prompton, Pa., assignors to Gentex Corporation, New York, N.Y., a corporation of Delaware
Filed Jan. 18, 1960, Ser. No. 3,151
2 Claims. (Cl. 138—132)

Our invention relates to a spirally-wrapped, heat-resistant hose and more particularly to an improved heat-resistant hose having a radiant heat reflecting outer covering.

In many instances high pressure tubing or hose is employed to carry highly combustible fluids such as fuel oil, gasoline, and the like. Tubing of this type is employed, for example, to convey the fuel in missile installations and in control lines of hydraulic systems. In addition to these uses it has other various applications.

One type of high pressure hose used for the purposes outlined above is formed from a fabric or wire-reinforced rubber or from plastic-impregnated fabric. In the event of a fire at the location at which the tubing is installed, the tubing is subjected to extremely high temperatures. Under the action of heat the tubing of the prior art described above deteriorates and develops leaks which permit the high combustible liquid to contact the flame. Not only does this action add fuel to the fire but it may produce an explosion or otherwise terminate the functional operation of the hose.

The copending application of Leonard P. Frieder and Jan V. Weinberger, Serial No. 825,063, filed July 6, 1959, discloses a high temperature resistant tubing adapted to be employed at locations at which highly combustible materials are conveyed. The hose disclosed in that application is made up of a plurality of layers of fibrous material having predetermined characteristics which inhibit the transfer of heat from the outer surface of the hose to the core tubing which may be a hose of the type known in the prior art. In the event of a fire at the location at which the heat resistant hose disclosed in the copending application is installed, flame and radiant heat directly contact the outer fibrous layer of the hose or the readily destroyed rubber coating applied thereto.

We have invented a spirally-wrapped, heat-resistant hose which is an improvement over the heat resistant hose disclosed in the copending application referred to hereinabove. Our heat resistant hose has a highly reflective outer layer which reflects radiant heat from the surface of the hose. While accomplishing its purpose of reflecting radiant heat from the surface of the hose, the outer covering of our improved hose permits the hose to flex in use without exposing the outer layer of the heat-resistant hose to radiant heat.

One object of our invention is to provide a spirally-wrapped, heat-resistant hose which is an improvement over heat-resistant hoses of the type known in the prior art.

Another object of our invention is to provide a spirally-wrapped, heat-resistant hose having an outer layer which reflects radiant heat while permitting the hose to flex.

Other and further objects of our invention will appear from the following description.

In general our invention contemplates the provision of an improved heat resistant hose having an outer heat reflecting layer provided by a lapped, spiral wrapping of metal foil tape. We lap the tape over approximately half its width and adhere the tape portions in contact with the hose to the outer surface of the hose while leaving the lapped outer portions free. Before wrapping we fold the tape across its width and wrap the tape with the folds outward to lessen the possibility of damage to the radiant heat reflective covering.

In the accompanying drawings which form part of the instant specification and which are to be read in conjunction therewith and in which like reference numerals are used to indicate like parts in the various views:

FIGURE 1 is a fragmentary view of a length of our spirally-wrapped, heat-resistant hose.

FIGURE 2 is a fragmentary view with parts in section of our spirally-wrapped, heat-resistant hose.

Referring now to the drawings, our spirally-wrapped, heat-resistant hose, indicated generally by the reference character 10, is applied, for example, to a length 12 of tubing of the type known in the prior art. One type of tubing 12 is formed from rubber reinforced with a pair of braided wire reinforcing layers 14 and 16. We apply a number of braided laminates or sleeves 18, 20, 22 and 24 to the outer surface of the tubing 12. The nature of these laminates 18, 20, 22 and 24 is described in detail in the copending application referred to hereinabove. The inner sleeve 18 is an insulating sleeve which inhibits the transfer of heat through the wall of the sleeve to the tubing 12. As is pointed out in the copending application, sleeve 18 is braided from yarns made up of a mixture of from about 45 percent to about 65 percent by weight of fine sheep's wool fibers with an optimum of about 50 percent by weight of sheep's wool fibers and with angora wool in an amount from about 15 percent to 35 percent by weight with an optimum of about 25 percent by weight of angora wool. We incorporate cellulose acetate rayon fibers in an amount from about zero percent to about 20 percent by weight with an optimum of about 15 percent by weight in the yarn. Nylon fibers in an amount from about 5 percent to about 15 percent with an optimum of about 10 percent by weight provide a carrier for the soft wool fibers. After this blend of fibers has been spun into a soft, low-twist yarn, it is braided to form the sleeve 18.

Each of the intermediate sleeves or layers 20 and 22 is braided from yarns including from about 55 percent by weight to about 70 percent by weight of acrylonitrile polymer fibers, from about 14 percent by weight to about 26 percent by weight of fine wool fibers such as angora wool and from about 15 percent by weight to about 25 percent by weight of cellulose acetate rayon fibers. This blend of fibers is spun into yarn braided to form the sleeves 20 and 22.

The sleeve 24 is formed from inorganic incombustible materials having a high degree of heat resistance, as compared with the degree of heat resistance of the acrylonitrile fibers, to provide a mechanical heat barrier. This sleeve may, for example, be formed from yarns made up of a major portion of asbestos fibers with from 10 percent to 20 percent by weight of glass or metallic fibers, the particular percentage of the glass or metallic carrier fibers being determined by the length of the asbestos fiber. After these fibers have been blended, they are spun into yarn and the yarn is blended to form the sleeve 24.

We build up the structure thus far described in the manner set forth in detail in the copending application referred to hereinabove, except that the asbestos yarn forming the outside layer 24 was treated with a 5 percent solution of tetra-isobutyl-titanate prior to braiding. To this layer 24, we apply one or more coatings of a silicone such, for example, as that silicone distributed by the General Electric Company, of Schenectady, New York, under the grade designation SE100. To apply the coating we treat the hose with a dispersion in toluene of SE100. After application, the coating is cured at a temperature of about 300° F. for five minutes.

Following the application of the first silicone coatings, we apply a pressure-sensitive adhesive to the hose to retain the wrapping to be described hereinafter in place on the hose. We employ any suitable pressure-sensitive adhesive known to the art for this purpose. For example, we may employ a silicone of the type made by Dow Corning Corporation of Midland, Michigan, and sold under the grade designation DC 269 or DC 271. This coating is applied in the form of a 25 percent solution by weight of the silicone in toluene. As is known in the art, these silicones are crystal-clear, inert liquids characterized by their excellent thermal stability and low viscosity-temperature coefficients. They are highly resistance to oxidation and shear breakdown. Moreover, these materials are highly water repellent and have excellent dielectric properties. Following the application of this material, the hose is placed in an oven at a temperature of about 350° F. to set the coating.

When these coatings have been applied in the manner described above, the hose is conditioned to receive the radiant heat reflective layer. To apply this layer, we take an aluminum foil tape 26 having a thickness of, for example, approximately 0.001 inch of a suitable width such, for example, as an inch and a quarter and fold the tape on itself in a direction transversely of the tape length to form a double thickness of tape. We spirally wrap the folded tape over the pressure-sensitive adhesive coating, indicated by the reference character 28, to form the radiant heat reflective layer. In the course of winding the folded tape on the hose, we lap the tape over approximately half its width, keeping the folds of the tape exposed and covering the free edges of the folded tape under the laps of the winding. It will be appreciated that by so winding the folded tape on the hose only those portions of the tape inboard of the laps are adhered to the hose by the pressure-sensitive adhesive and the laps themselves are free to move with respect to those adhered tape portions over which they lie. At the same time we have four thicknesses of aluminum tape over the hose at all points along its length. Owing to the fact that only the folded edge of the tape is exposed, there is little likelihood that the tape will tear. It will be appreciated that while this winding of the tape 26 provides a highly reflective layer for the hose, at the same time it permits the hose to flex without disturbing the covering and without exposing any of the hose covered by the winding.

If desired, following the application of the coating, the foil 26 may be coated with a microscopic film of a silicon such, for example, as DC 7 or DC 200 made by the Dow Corning Corporation. This outer microscopic coating acts as a lubricant to prevent deterioration of the foil by friction. We have discovered that the silicon film does not appreciably affect the ability of the foil 26 to reflect radiant heat. If desired, the hose may be covered with a thin tubular shield to protect it during transportation. If this is done, the outer shield should be removed after the hose has been attached in place since if the shield were destroyed upon being subjected to heat, it would leave a dark deposit on the foil to detract from the radiant heat reflecting properties of the foil. While we have described our outer heat reflective layer as being formed from aluminum foil, it will readily be appreciated that any other material capable of reflecting radiant heat could be used in place of aluminum foil to form the spiral wrapping.

In use of our spirally wrapped heat-resistant hose, the heat reflective winding is applied in the manner described hereinabove with the folded tape lapped over approximately half its width and with the folded edge of the tape exposed. With this construction a radiant heat reflective covering is applied to the hose without detracting from the flexibility of the hose. When the hose flexes, the free laps of the spiral wrapping move with respect to the adhered foil portions underlying the laps to permit the hose to flex without destroying the heat reflective covering. At the same time no portion of the hose beneath the covering is exposed to radiant heat. The manner in which we wrap the foil 26 on the hose with the folded edge of the foil exposed protects the reflective covering against damage by tearing of the foil or the like. This manner of wrapping the hose permits us to use a relatively thin tape to form a strong covering.

It will be seen that we have accomplished the objects of our invention. We have provided a spirally-wrapped, heat-resistant hose having an outer radiant heat reflective coating while permitting the hose to flex. The portion of the hose below the outer heat reflective layer remains covered even when the hose flexes. By our manner of winding the hose, we are able to use a relatively thin tape to provide a strong covering.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A protective covering for a length of flexible tubing adapted to carry a fluid including in combination a sleeve of heat-resistant material adapted to be applied to said tubing, said heat-resistant material inhibiting the ready transfer of heat therethrough, a spiral wrapping of heat-reflective material forming a covering for said sleeve, said heat-reflective material being lapped over a portion of its width to provide overlapped portions of said heat-reflective material and other portions of said heat-reflective material underlying said overlapped portions and means for adhering said underlying portions of said heat-reflective material to said sleeve while leaving said overlapped portions of said heat-reflective material free of said underlying portions to permit said hose to flex without exposing said sleeve.

2. A protective covering for a length of flexible tubing adapted to carry a fluid including in combination a sleeve of heat-resistant material adapted to be applied to said tubing, said heat-resistant material inhibiting the ready transfer of heat therethrough, a spiral wrapping of heat-reflective tape forming a covering for said sleeve, said tape being doubled across its width to provide a double edge, said doubled tape being lapped over a portion of its width after doubling to provide overlapped portions of said doubled tape and other portions of said doubled tape underlying said overlapped portions and means for adhering said underlying portions of said doubled tape to said sleeve while leaving said overlapped portions of said doubled tape free of said underlying portions to permit said hose to flex without exposing said sleeve.

References Cited in the file of this patent
UNITED STATES PATENTS

| | | |
|---|---|---|
| 2,047,778 | Hayden | July 14, 1936 |
| 2,098,615 | Cowdery | Nov. 9, 1937 |
| 2,741,108 | Rogosin | Apr. 10, 1956 |
| 2,861,598 | Carder | Nov. 25, 1958 |
| 2,884,018 | Delcellier | Apr. 28, 1959 |
| 2,937,665 | Kennedy | May 24, 1960 |
| 2,985,552 | Watanabe | May 23, 1961 |